A. E. LYMAN.
VENTILATING COFFINS.
No. 36,660. Patented Oct. 14, 1862.
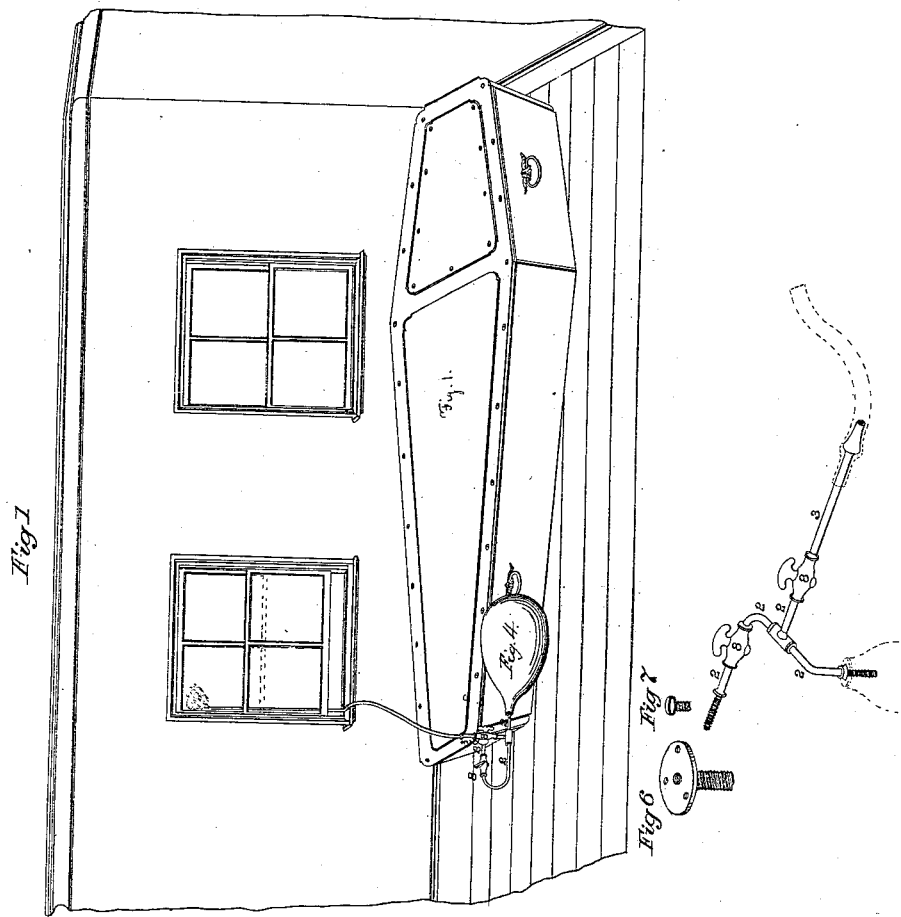
Witnesses:
Inventor:
Alfred E. Lyman

UNITED STATES PATENT OFFICE.

ALFRED E. LYMAN, OF WILLIAMSBURG, MASSACHUSETTS.

IMPROVEMENT IN VENTILATING COFFINS.

Specification forming part of Letters Patent No. 36,660, dated October 14, 1862.

*To all whom it may concern:*

Be it known that I, ALFRED E. LYMAN, of Williamsburg, in the county of Hampshire and State of Massachusetts, have invented a new and improved mode for ventilating coffins, caskets, and burial-cases when overcharged with offensive gases or foul effluvia arising from dead bodies being placed therein; and I do hereby declare that the following is a full and exact description thereof, reference being had to the accompanying drawings, and to the letters of reference marked thereon, which form a part of this specification.

The nature of my invention and improvement consists in attaching at any desirable moment what I term an "indicating-ventilator" to any desirable part or portion of coffins, caskets, burial-cases of any conceivable form used for burying the dead, indicating the necessity of an egress or outlet for the foul gases or effluvia within the said coffins, caskets, or burial-cases when closely confined therein.

To enable others skilled in the art to make and use my invention, I will proceed to describe its construction and operation.

Figure 1 shows the coffin; Fig. 2, the tube attached to the coffin. Fig. 3 shows the extension of the tube to connect with pipe or tube, as represented in Fig. 5. Fig. 4 shows an air-chamber. Fig. 8 stop-cocks affixed to said tubes or conductors; Fig. 6, screws with a flange affixed to top, sides, or ends of coffins, caskets, or burial-cases; Fig. 7, screws to fit in the interior of screw and flange, as seen in Fig. 6, when the tube or ventilating apparatus is not in use.

I construct my tubing in any of the known forms, made from brass, copper, india-rubber, gutta-percha, or any other suitable material for conducting gases such as arise from the decomposing of dead bodies placed in close confinement in coffins, caskets, or burial-cases, connecting the same with stop-cocks and tubing, as seen in Figs. 2 and 8, and extending to part 4, and connecting also with part 5 in an angular form or otherwise, part 5 being made of india-rubber, gutta-percha, or other suitable material, and extending to any desirable distance from part 3, and acting as a conductor from parts 3 and 4.

Part 4 is an air-chamber, made of india-rubber or any other material capable of expansion and contraction, being air and water tight, and when inflated will indicate the presence of foul gases, which can be regulated optionally by use of the stop-cocks, as shown in Fig. 8.

The connection of parts 3 and 5 may be made either by means of the usual screws and fastenings, as seen in the accompanying drawings, or by the use of the rubber tubing drawn on over a projection or shoulder, of sufficient size as to make the rubber tubing adhere so closely as to prevent the egress and ingress of air, as is seen at the connection of part 4 (or air-chamber) with Fig. 2.

The screw with flanges, as seen in Fig. 6, is made of the same material as the metallic tubing, as seen in Fig. 2, and is fastened to the coffin, casket, or burial-case by means of a thread cut on the outside of said Fig. 6, or screw with flange, said screw having an aperture or hole of sufficient size to let out the confined gas when screwed closely in the coffin, casket, or burial-case. In the flange is two or more apertures to receive screws to fasten it more firmly on the outside of the coffin, casket, or burial-case.

The small screw, as seen in Fig. 7, is used to fasten closely the hollow tubing, as seen in Fig. 6, so as to prevent the escape of the foul air or gas within said coffins, caskets, or burial-cases when not using the indicating-ventilator.

The above-described invention is cheap in construction and adaptation, and can be readily applied and used to the greatest advantage, comfort, and convenience in the usual modes of keeping dead bodies, or in transmitting them long distances in all the ordinary and common modes of conveyances now in use—such as steam-vessels, boats, rail-cars, or otherwise—thus accomplishing an object so long and so much desired.

What I claim as my invention, and desire to secure by Letters Patent, is—

In the indicating-ventilator as herein described and substantially set forth I do not claim the elastic bag on the stop-cock and tubing or pipe, taken separately, as my invention; but I do claim as my invention the combination and application and arrangement of the aforesaid apparatus and mode of applying the same for the purposes as above described, and substantially as set forth.

ALFRED E. LYMAN.

Witnesses:
R. F. HIBBARD,
J. HOLLENDER.